United States Patent

[11] 3,546,998

| [72] | Inventor | Lester Lerich |
|---|---|---|
| | | Lakewood, Colo. |
| [21] | Appl. No. | 756,756 |
| [22] | Filed | Sept. 3, 1968 |
| [45] | Patented | Dec. 15, 1970 |
| [73] | Assignee | Wej-It Expansion Products Inc. |
| | | Broomfield, Colo., |
| | | a corporation of Delaware |

[54] HINGE-TYPE ANCHOR BOLT
7 Claims, 5 Drawing Figs.

[52] U.S. Cl. .................................................. 85/72,
85/79, 85/80, 85/87
[51] Int. Cl. ..................................................... F16b 13/06
[50] Field of Search.......................................... 85/63, 64,
72, 79, 80, 81, 86, 87, 88, 3, 38, 3K, 33, 73, 74, 75,
76; 287/124; 24/126, 136, 211P, 230.1s; 285/419

[56] References Cited
UNITED STATES PATENTS

| 1,066,227 | 7/1913 | Rosenberg.................... | 85/87 |
|---|---|---|---|
| 1,652,169 | 12/1927 | Fleming........................ | 85/33 |
| 2,267,420 | 12/1941 | Pleister......................... | 85/85 |
| 2,349,075 | 5/1944 | Cole.............................. | 85/72 |
| 2,362,969 | 11/1944 | Boelter......................... | 85/79 |
| 3,257,891 | 6/1966 | Lerich........................... | 85/87 |
| 3,277,770 | 10/1966 | McCulloch................... | 85/87 |

FOREIGN PATENTS

| 82,755 | 3/1964 | France .......................... | 85/79 |
|---|---|---|---|
| 801,569 | 5/1936 | France .......................... | 287/124 |
| 1,056,363 | 10/1953 | France .......................... | 85/79 |

*Primary Examiner*—Marion Parsons, Jr.
*Attorney*—John E. Reilly

ABSTRACT: An anchor bolt is provided with wedge members which are assembled on the bolt by means of hinges, the hinges serving the dual purpose of maintaining the wedge members in properly aligned relation on the bolt prior to insertion in a hole and, upon insertion in the hole, are cooperative to rapidly urge the wedge members outwardly into anchored engagement with the wall of the hole when the bolt is displaced in the direction of withdrawal from the hole.

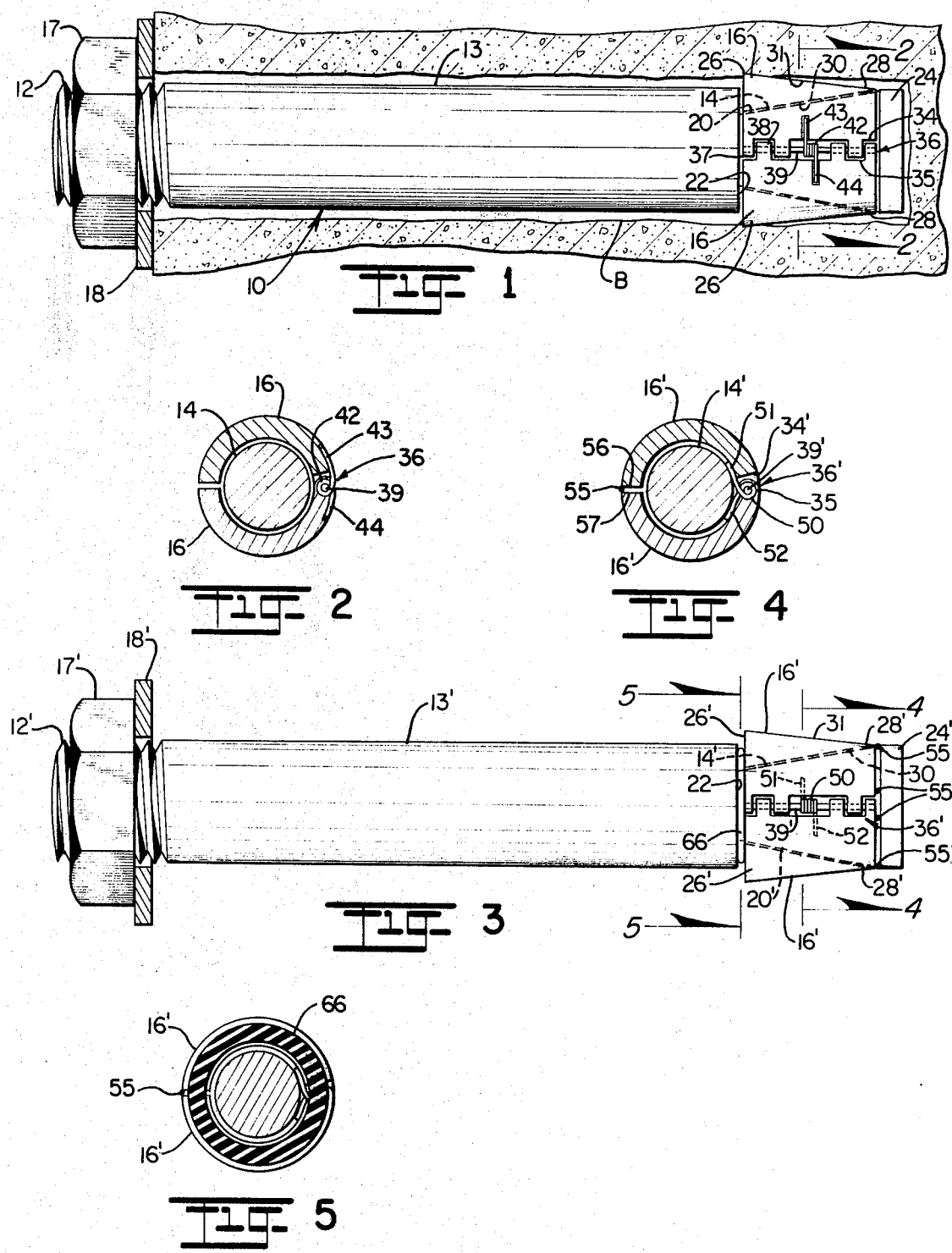

HINGE-TYPE ANCHOR BOLT

SPECIFICATION

This invention relates to novel and improved anchor bolts, and more particularly relates to anchor bolts provided with wedge members capable of advancing automatically into anchored engagement with the wall of the hole.

Anchor bolts have been devised which employ wedge members located in circumferential grooves or recesses on the bolt shank. Typically the grooves have an inner inclined bearing surface against which the wedge members are positioned so that when the bolt member is tightened or moved in the direction of withdrawal from the bolt hole the wedge members will slide forwardly and outwardly along the bearing surface into wedging engagement. Of course the form of bolt described depends for its operation upon initial engagement between the wedge members with the wall of the hole in order that the wedge members will be frictionally engaged by the wall surfaces to slide forwardly in relation to the bolt along the inclined surfaces of the groove, and accordingly the hole size or diameter must closely correspond to the diameter of the bolt for effective wedging action. In addition, means must be provided or employed to hold the wedge members in properly assembled relation in the grooves prior to insertion in the hole. In the past this has been done usually be a retainer band or ring positioned around the wedge member; and the retainer is either ruptured or slipped off the wedge members as the bolt is inserted into the hole. Furthermore, to encourage initial engagement between the wedge member and the wall of the hole it has been proposed in the past to utilize different types of biasing elements, such as, springs, positioned behind the wedges or rubber-like biasing members positioned between adjacent sides of the wedges. Here, reference is made to U.S. Pat. No. 3,257,891, assigned to the assignee of this application.

While anchor bolts of the type described have been entirely satisfactory for their intended use and purpose, it is desirable to devise an anchor bolt in which a common element serves both as the retention and the biasing means for the wedge members and in such a way as to facilitate rapid assembly, ready insertion into a hole and a greater degree of lateral expansion of the wedge members into anchored engagement with the wall of the hole notwithstanding slight differences in size between the bolt and hole. This may be accomplished in a unique manner through utilization of a hinge between adjacent sides of a pair of wedge members wherein the hinge has the capability of either normally urging the wedge members inwardly within the grooved surface, or of urging the wedges outwardly in the opposite direction to effect rapid lateral expansion into wedging engagement.

Accordingly, it is an object of the present invention to provide for a novel and improved anchor bolt of the type having wedge elements movable automatically into anchored engagement with the wall of a hole into which the bolt is inserted.

Another object of the present invention is to provide for a new and useful form of connecting means for wedge expansion elements on an anchor bolt which will perform the dual function of retaining the wedges in assembled relation on the bolt and of cooperating with the wedges for lateral outward expansion into anchored relation within a hole.

It is a further object of the present invention to provide an anchor bolt construction conformable for different applications and uses and being adapted for installation in different types of materials, such as, masonry, concrete, metal or rock.

In accordance with the present invention, an anchor bolt is provided with a circumferential groove including an outwardly and forwardly inclined bearing surface defining the inner wall of the groove. Sleeve-type wedge members are dimensioned for insertion in the groove normally to lie within the peripheral outline of the shank so as not to interfere with insertion of the bolt into a hole and to permit the diameter of the bolt to closely correspond to that of the hole. A hinge member serves to interconnect adjacent side edges of the wedge members, the hinge preferably including a biasing element which is operative to normally urge the wedge members inwardly against the inner wall surface of the groove; or in the alternative the biasing element may urge the wedge members to undergo outward lateral expansion against the wall of the hole.

The above and other advantages and features of the present invention will become more readily appreciated and understood from a consideration of a detailed description of preferred and alternate forms thereof when taken together with the accompanying drawings, in which:

FIG. 1 is an elevational view of a preferred form of expansion bolt provided with hinge-connected members arranged in assembled relation on the bolt.

FIG. 2 is a sectional view taken about lines 2-2 of FIG. 1.

FIG. 3 is a view of an alternate form of expansion bolt in which the hinge-connected wedge members are biased outwardly and are temporarily secured in assembled relation by a solder connection between the wedge members.

FIG. 4 is a sectional view of the alternate form of expansion bolt taken about lines 4-4 of FIG. 3; and FIG. 5 is a sectional view taken about lines 5-5 of FIG. 3.

Referring in detail to the drawings, there is illustrated in FIGS. 1 and 2 a preferred embodiment of the present invention wherein an anchor bolt 10 is conventionally provided with an externally threaded end 12, an elongated, generally cylindrical shank 13, and a wedge-receiving circumferential groove or recess 14 disposed at or in proximity to the leading end of the bolt shank for reception of wedge members 16. The bolt assembly described is especially adapted for insertion in an opening or bore B which may be formed in a building wall or other structure for the purpose of securing an object to the wall, and where the size of the bore generally conforms to the external diameter of the shank. Conventionally, anchoring of the bolt may be effected by tightening means in the form of a nut 17 and washer 18 placed on the threaded end 12 of the bolt; and, upon tightening the nut, the bolt member will be urged outwardly in the direction of withdrawal through the bore so as to cause the wedge members to slide forwardly along the bearing surface in the groove and to expand outwardly in a radial direction into positive gripping engagement with the surrounding wall surface of the bore.

In the specific form of bolt assembly shown in FIGS. 1 and 2, the circumferential groove 14 is most desirably formed out of the external peripheral surface of the shank relatively near the leading end. Here the groove is provided with an inclined circumferential bearing surface 20 diverging forwardly from a relatively deep rearward end having an undercut shoulder 22 at the intersection with the external surface of the shank; and the inclined bearing surface terminates in a leading extremity 24 which has a diameter preferably corresponding to that of the major diameter of the bolt.

The anchoring elements are defined by sleeve-type wedge members 16, each wedge being generally semicircular in cross section and of a length corresponding to that of the inclined bearing surface 20. Each of the wedge members is graduated in thickness so as to generally correspond to the reduction in depth of the groove from the trailing end, and accordingly the wedge in cross section tapers forwardly from a relatively thick trailing end 26 to terminate in a relatively narrow, tapered forward end 28. In this form, each wedge member has a trailing edge surface which is squared to the longitudinal axis of the bolt with inner and outer inclined surfaces 30 and 31, respectively, tapering or converging forwardly for termination in a pointed extremity at the leading end portion 28 of each wedge. Moreover, in the form shown the thickness of the wedge at its trailing end slightly exceeds the circumferential depth of the groove so as to project outwardly in a radial direction beyond the peripheral surface of the shank when the wedge are placed on the inclined bearing surface 20 of the groove, but again taper forwardly so that the extremities generally correspond to the diameter of the shank.

In order for the wedge members to be retained in aligned relation on the bolt shank, adjacent longitudinal edge surfaces 34 and 35 along one side of the wedge member are provided with a hinge assembly 36. As shown, the hinge assembly includes complementary hinge leaf portions 37 and 38, along the edge surfaces 34 and 35, respectively, which are provided with through bores aligned for reception of a hinge pin 39. In order to urge the wedge members normally in an inwardradial direction, a coil spring member 42 is positioned on the hinge pin 39 intermediately between hinge leaf portions 37 and 38 with outer free end portions 43 and 44 of the spring being seated in external slots on the external surface of the wedge member. The spring is tensioned to exert an inward biasing force through the free ends 43 and 44 to normally urge the wedge members into firm engagement with the inclined bearing surface in the grooves. In this relation, the force of the spring acting upon the wedge members is sufficient to retain the wedges in assembled relation within the grooved section of the bolt; however, this force is easily overcome by positive expansion of the wedge members under frictional engagement with the wall of the bore as they are caused to slide forwardly and outwardly along the bearing surface.

In use, the anchor bolt 10 will approximate or be slightly less than the diameter or opening of bore B so that upon insertion into the hole there will be some contact between the wall of the bore and the external surfaces of the wedge members, especially between the trailing end 26 and the wall surface. As the bolt is inserted into the opening, the external surfaces of the wedge members will frictionally engage the surrounding wall of the bore but in a direction tending to retract the wedges rearwardly and inwardly against the full depth of the groove and of course the spring elements 42 will cooperate in maintaining the wedge members in this position. Once the bolt member has been inserted to its full depth in the hole the nut 17 is tightened against the washer 18 and against the surrounding edge of the bore to cause the bolt shank to be urged in the direction of withdrawal from the hold. However it will be noted that the expansion members are free to slide forwardly along the inclined bearing surface and to undergo outward radial expansion into firm anchored relation within the hole. Forward movement of the wedges is effected by engagement of the external surfaces of the wedges, particularly the outside corners formed between the trailing edges and the external surfaces of the wedges which effect biting engagement with the wall surface of the hole; also, the tapered configuration of the wedges will tend to cause more rapid outward expansion into positive anchored engagement with the wall and will tend to overcome the spring force normally retaining the wedges upon the bolt. Furthermore the hinged connection will coordinate movement and expansion of the wedges along the inclined bearing surface without interfering with their outward radial expansion into firm anchored relation. Again, since the relatively thick trailing edges of the wedge members protrude or project beyond the external surface of the bolt the outside corners will engage the wall surface of the hole in a direction to prevent any slipping between the wedges and wall surfaces and tend to bite into and seize the wall surface.

In the alternate form of invention shown in FIGS. 3 to 5, the basic construction of the bolt and of the wedge members essentially corresponds to that in FIG. 2 and accordingly like parts are correspondingly enumerated. Here, a spring element 50 is substitute for element 42 and is so positioned between the wedge members 16' as to exert an outward biasing force upon the wedges. Accordingly, the spring is coiled in surrounding relation to the pin with the inner free ends 51 and 52 extending inwardly in opposite directions from the pin into engagement with the inner surfaces of the wedge members 16'. The spring bias will uncoil the spring in a direction causing the free ends 51 and 52 to move outwardly in a radial direction against the inner surfaces of the wedge members. It will be evident that some auxiliary means is therefore required to temporarily or releasably retain the wedge members in assembled relation on the bolt prior to insertion in the hole and, for this purpose, a solder or epoxy joint or connector 55 may be applied between opposite longitudinal edges of the wedges 56 and 57 of the wedge members to serve as a temporary means of connection when the latter are assembled on the bolt shank in the manner described. As a suitable alternative the solder-type connector may be applied between the leading ends of the wedges and the extremity 24 of the bolt, as indicated at 55'. and the extremity 24 of the bolt, as indicated at 55'.

Additionally, a resilient expansion member 66 is interpositioned between the undercut shoulder portion 22 and trailing edge surfaces of the wedges, the member 66 being suitably composed of a rubber or rubber-like material, for example in the form of an O-rings which will act against the ends of the wedges in the direction of expansion. As the bolt member is inserted in the hole, the wedges will be urged inwardly and rearwardly along the bearing surface 20 to compress the member 66. However as the bolt is urged in the direction of withdrawal the member 66 will cooperate initially to urge the wedges forwardly along the inclined bearing surface 20 to effect outward radial expansion of the wedges into firm anchored engagement with the wall of the hole. It will be evident that the resilient biasing member 66 may serve as an effective means of expansion for the wedge members either alone or in cooperation with the inwardly biased wedge assembly shown in FIGS. 1 and 2. Thus, the member 66 may be employed as an expansion element for semicircular or sleeve-type wedge members which are mounted independently of one another or in hinged relation on the bolt shank, for example, as shown in the form of bolt assembly of copending application for U.S. filed Apr. 20, 1966, U.S. Ser. No. 543,857. Furthermore, the resilient expansion element may be employed with other forms of wedge members, such as, those of the type illustrated and described in U.S. Pat. No. 3,257,891.

When the alternate form of bolt assembly is inserted in a bore, the wedge members will be held in retracted relation against the undercut shoulder 22 of the shank. As the nut member 17 is tightened to cause displacement of the bolt member in the direction of withdrawal the frictional engagement of the external surfaces of the wedge members with the wall of the bore will cause the wedges to move in the direction of expansion along the inclined bearing surfaces and under sufficient force to break the soldered connection. At this point, the outward spring pressure exerted by the free ends 51 and 52 will cooperate to increase the effective diameter of the wedges until firm anchored engagement is established with the surrounding wall of the hole. Accordingly, the outward biasing force exerted by the free ends of the spring 50 will tend to cause more rapid expansion of the wedges into firm wedging engagement with the hole. In a typical installation, of course, releasable retention means other than the solder connection shown may be employed in cooperation with the hinge to retain the wedges in assembled relation on the shank, such as, a frangible retainer band surrounding the wedges which will be broken or ruptured under the external force of the wedges in sliding forwardly along the inclined bearing surface.

It will be recognized from the foregoing description of preferred and alternate forms of the present invention that an improved form of anchor bolt assembly has been devised which is characterized in particular by utilization of a hinge member between the wedges to achieve the desired wedging action depending upon the intended application or use of the bolt assembly. The hinge form of connection greatly facilitates assembly of the wedge members in place on the bolt, together with uniform movement and expansion of the wedge members forwardly into wedging engagement. Further the hinge connection may employ a spring or toggle member to effect the desired biasing action both in retaining the wedge members in assembled relation on the bolt and to cooperate in expanding the wedges outwardly under forward displacement along the bearing surface of the groove. At the same time the hinge connection will permit the wedge members to be normally disposed to lie in flush relation, or substantially so, to the peripheral outline of the bolt shank in order that the size of the bolt or its diameter may correspond with the size of the bore hole. Moreover, use of the hinge connection associated with sleeve-type wedge members will permit substantially 360° wedging action with uniform engagement with the wall of the hole.

It is therefore to be understood from the foregoing description of preferred and alternate forms of the present invention that various modifications and changes may be resorted to in the specific design, construction and arrangement of parts without departing from the spirit and scope of the present invention.

I claim:

1. In an expansion bolt having a bolt member adapted for insertion in a bore substantially corresponding to the diameter of the bolt member, said bolt having a generally cylindrical shank including an annular wedge-receiving groove provided with an inclined bearing surface diverging forwardly toward the leading end of the shank, the combination of:

at least two sleeve-like wedge members generally circular in cross section and lying substantially within the peripheral outline of the shank, said wedge members having opposite longitudinal side edges with at least one longitudinal edge disposed in adjacent facing relation to an edge of an adjacent wedge member;

a hinge member interconnecting adjacent longitudinal side edges of said wedge members in hinged relation to one another, said wedge members being movable to slide forwardly along the inclined bearing surface from a normally retracted position within the groove to an expanded position under displacement of said bolt member in the direction of withdrawal from the bore, said hinge member including complementary hinge leaves extending circumferentially from adjacent side edges of said wedge members, spring means associated with said hinge leaves and a hinge pin extending in a longitudinal direction through aligned openings in said hinge leaves, said spring means positioned on said hinge pin with outer free end portions thereof in engagement with said wedge members; and tightening means on said bolt member being operative to urge said bolt member in the direction of withdrawal from the bore whereby to cause forward displacement of said wedge members into wedging engagement with the wall of the bore.

2. In an expansion bolt according to claim 1, said spring means normally biasing said wedge members in an inward radial direction within the groove.

3. In an expansion bolt according to claim 1, said spring means normally urging said wedge members in an outward radial direction away from the groove and releasable retention means cooperating with said hinge member to retain said wedge members in assembled relation in the recess without interfering with forward displacement of said wedge members from the retracted to the expanded position.

4. In an expansion bolt according to claim 1, said releasable retention means being defined by a frangible joint interconnecting the longitudinal side edges on the side opposite said hinge member.

5. In an expansion bolt according to claim 1 wherein the groove has an undercut shoulder portion substantially squared to the longitudinal axis of said shank, and further including resilient expansion means interpositioned between the shoulder of the groove and the trailing ends of said wedge members, said resilient expansion means being defined by an annular washer composed of a rubber-like material.

6. In an expansion bolt having a bolt member adapted for insertion in a hole substantially corresponding to the diameter of the bolt member, said bolt member having a generally cylindrical shank including an annular groove provided with a shoulder portion at its rearward end and an inclined bearing surface diverging forwardly from the shoulder toward the leading end of the shank:

wedge members adapted for insertion in the groove normally to lie within the peripheral outline of the shank, and being slidable forwardly along the inclined bearing surface into wedging engagement with the wall of the hole;

resilient expansion means defined by an annular washer in the form of an O-ring composed of a rubber or rubber-like material interposed between the shoulder of the groove and the trailing ends of said wedge members within the peripheral outline of said bolt member, said resilient expansion means being compressed by said wedge member during insertion of said bolt member into the hole and initiating forward displacement of said wedge members along the inclined bearing surface upon subsequent movement of the bolt member in the direction of withdrawal;

releasable retention means for retaining said wedge members in assembled relation in the groove without interfering with forward displacement of said wedge members to the expanded position; and tightening means being operative to urge said bolt member in the direction of withdrawal from the hole whereby to cause forward displacememnt of said wedge members into wedging engagement with the wall of the hole.

7. In an expansion bolt according to claim 6, further including a hinge member interconnecting said wedge members without interfering with forward displacement and expansion of said wedge members into wedging engagement with the hole.